United States Patent
Al-Maghlouth et al.

(10) Patent No.: US 10,962,968 B2
(45) Date of Patent: Mar. 30, 2021

(54) PREDICTING FAILURES IN ELECTRICAL SUBMERSIBLE PUMPS USING PATTERN RECOGNITION

(71) Applicant: Saudi Arabian Oil Company, Dhahran (SA)

(72) Inventors: Abdulmonam Al-Maghlouth, Al-Khobar (SA); Obiomalotaoso Leonard Isichei, Dhahran (SA); Mohammad Fahad Al-Qasimi, Jubail (SA)

(73) Assignee: Saudi Arabian Oil Company, Dhahran (SA)

(*) Notice: Subject to any disclaimer, the term of this patent is extended or adjusted under 35 U.S.C. 154(b) by 336 days.

(21) Appl. No.: 15/951,798

(22) Filed: Apr. 12, 2018

(65) Prior Publication Data

US 2019/0317488 A1   Oct. 17, 2019

(51) Int. Cl.
*G05B 23/02* (2006.01)
*E21B 43/12* (2006.01)

(52) U.S. Cl.
CPC ........ *G05B 23/0283* (2013.01); *E21B 43/128* (2013.01); *G05B 23/0248* (2013.01); *G05B 23/0275* (2013.01)

(58) Field of Classification Search
CPC .................................................. G05B 23/0283
USPC ......................................................... 702/184
See application file for complete search history.

(56) References Cited

U.S. PATENT DOCUMENTS

| | | | |
|---|---|---|---|
| 2004/0044499 A1* | 3/2004 | House | H02P 29/02 702/181 |
| 2005/0044451 A1 | 2/2005 | Fry et al. | |
| 2006/0010352 A1 | 1/2006 | Mukheljee et al. | |
| 2007/0252717 A1* | 11/2007 | Fielder | E21B 47/0007 340/648 |
| 2013/0175030 A1* | 7/2013 | Ige | G05B 15/02 166/250.15 |
| 2016/0217379 A1 | 7/2016 | Patri et al. | |
| 2017/0096889 A1* | 4/2017 | Blanckaert | E21B 44/00 |
| 2017/0363088 A1* | 12/2017 | Nguyen | E21B 47/0007 |
| 2019/0287005 A1* | 9/2019 | Subramaniyan | G06N 5/04 |
| 2020/0141412 A1* | 5/2020 | Nguyen | E21B 47/008 |

FOREIGN PATENT DOCUMENTS

| | | | |
|---|---|---|---|
| WO | 2007107815 | 9/2007 | |
| WO | 2013090416 | 6/2013 | |
| WO | 2015047594 | 4/2015 | |
| WO | 2016153895 | 9/2016 | |
| WO | 2017161126 | 9/2017 | |
| WO | WO-2017161126 A1 * | 9/2017 | ........... E21B 47/008 |

OTHER PUBLICATIONS

International Search Report and Written Opinion issued in International Application No. PCT/US2019/023853 dated Jul. 2, 2019, 14 pages.

* cited by examiner

*Primary Examiner* — Ricky Ngon

(74) *Attorney, Agent, or Firm* — Fish & Richardson P.C.

(57) ABSTRACT

Sensor data is received from a plurality of sensors contained in an electrical submersible pump (ESP) deployed in a well hole. An early indication of an ESP failure that is imminent is determined in real time using a pattern recognition methodology based on the sensor data and a pattern detection model that correlates historical ESP failures with historical sensor readings. A notification of the imminence of the ESP failure is provided.

20 Claims, 9 Drawing Sheets

PREDICTING FAILURES IN ELECTRICAL SUBMERSIBLE PUMPS USING PATTERN RECOGNITION

BACKGROUND

The present disclosure applies to techniques for using pattern recognition to predict failures in electrical submersible pumps (ESPs).

SUMMARY

The present disclosure describes techniques that can be used for predicting failures in electrical submersible pumps (ESPs) using pattern recognition. In some implementations, a computer-implemented method, includes: receiving sensor data from a plurality of sensors, each sensor contained in an ESP deployed in a well hole; determining, in real time using a pattern recognition methodology based on the sensor data and a pattern detection model that correlates historical ESP failures with historical sensor readings, an early indication of an ESP failure that is imminent; and providing a notification of the imminence of the ESP failure.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, automated and integrated systems that predict ESP failures can provide an accurate and efficient manner for production operations. Second, a single integrated solution can be used for ESP monitoring, optimization, and failure prediction. Third, techniques can use big data analytics to prevent equipment failures, extend the run life of the equipment, and maximize production using the equipment. Fourth, prediction of ESP failures can help in allocation and prioritizing ESP replacements.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
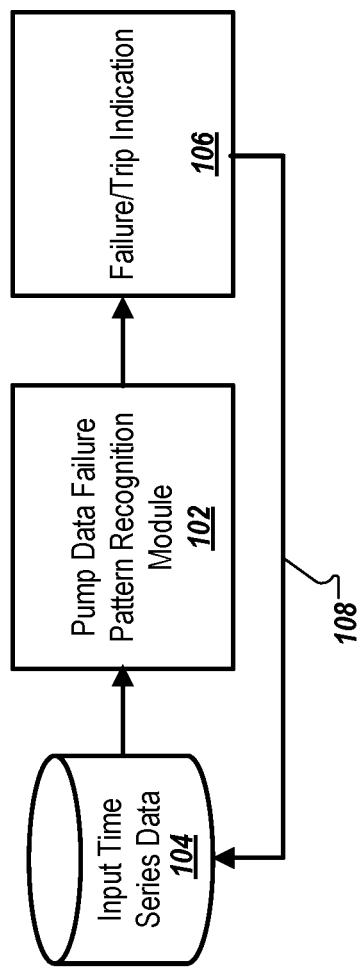
FIG. 1 is a block diagram illustrating an example of an architecture for pump data failure pattern recognition, according to some implementations of the present disclosure.

The following detailed description describes techniques that can be used for predicting failures in electrical submersible pumps (ESPs) using pattern recognition. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The techniques described in the present disclosure can complement traditional monitoring techniques and improve overall ESP performance based on pattern recognition rather than replying completely on traditional single tags and sensors alarms. When an integrated advanced ESP monitoring solution is deployed, engineers can be able to immediately identify ESP problems and immediately prevent, or plan for, a potential failure event, in addition to using individual sensor deviations. An ESP failure prediction model can be run and deployed in real time to detect, prevent, and plan for possible failures. The ESP failure prediction model can also integrated with ESP monitoring solutions. Techniques for predicting failures in ESPs can provide information to mobile applications, web-based systems, or other user front-ends.

Prediction models can be trained using big data, including historical sensor readings and subsequent failures, using information from various geographic regions, such as North America, South America, Africa, Australia, Europe, and Asia. Resulting models can yield promising results in detecting failure events ahead of time. For example, the models can be used to identify a 25-day lead time between a detected event and a failure. Such lead times can provide an alarm/action framework that can help the engineers to proactively diagnose and solve issues, so as to avoid failures or to plan for failures that cannot be avoided.

One of the key challenges and deficiencies of failure prediction techniques includes the accuracy and availability of data that can be used for prediction. For example, to train the models, a team can invest a significant amount of time to select an appropriate, clean training data set, allowing the information to be filtered in order to classify failures. Using these techniques, engineers can focus on preventing unplanned ESP trips and failures, and can prioritize ESP replacement activities, contracts, and strategies.

Techniques described in the present disclosure can include the use of advanced pattern recognition methodologies to analyze ESP historical failures and predict potential failures in real time. The techniques can be developed using smart pattern prediction algorithms that may currently be automated to run real-time stream part of ESP integrated monitoring environments. The techniques can extend traditional real-time monitoring that is based on per-sensor thresholds to detect overall ESP performance issues by highlighting low-high alarm areas for critical events based on key ESP sensor behavior over time.

The techniques and resulting models can be tested against old and recent ESP failures. By using pattern recognition, the techniques can be used to successfully detect failure events ahead of time, providing a significant impact by ESP predictive operations to prevent failures, extend ESP run life, and maximize the production.

Prediction methodologies can use major ESP downhole sensor data such as motor temperature, amps, and vibration to create ESP smart pattern recognition and prediction models. Models can first be trained to understand normal and abnormal behaviors of each sensor, and the models can classify types of possible failures under low warnings (or high warnings) based on the severity of the alarm. An objective of the prediction methodologies is to alarm production engineers in a timely manner to prevent ESP trips, unplanned failures, and extend equipment run life. Models can be enhanced and trained to detect and recommend actions on each type of ESP failure, including burnt motors, broken shafts, and hydrogen sulfide ($H_2S$) problems.

FIG. 1 is a block diagram illustrating an example of an architecture 100 for pump data failure pattern recognition, according to some implementations of the present disclosure. The architecture 100 includes a pump data failure pattern recognition module 102 that processes input time series data 104 to produce, as output, a failure/trip indication 106. Over time, the failure/trip indication 106 can complement, or be incorporated into, the input time series data 104, as indicated by an iteration arrow 108. Over time, the iteration can improve the accuracy and usefulness of output that is produced by the pump data failure pattern recognition module 102.

Electrical submersible pumps can be deployed with smart sensors such as vibration (V), temperature (T), current (I), intake pressure (I.P), and discharge pressure (D.P) sensors. The sensors can provide an early indication of a pending ESP failure. The failures can include several classifications of ESP failures such as a burnt motor failure or a stuck ESP pump. The pump data failure pattern recognition module 102 can process readings from multiple sensors and provide an early warning during abnormal conditions. The pump data failure pattern recognition module 102 can also be linked automatically to a failure database and an ESP factors database that includes information regarding different ESP types. In the case of a burnt motor in an ESP, historical behavior of failed pumps can show, for example, that before an actual failure of the pump occurs, there is a rise in intake pressure, a rise in motor temperature, and stable discharge pressure. For example, before the failure, each sensor can generate deviating patterns that can include a recognizable pattern of a wide range of consistent highs or consistent lows from which a tree pattern can be generated. An algorithm that is used to predict failures can factor in acceptable limits of each sensor. For example, a combination of a rising ESP intake pressure, a stable discharge pressure, and several trending sensors with "abnormal tree patterns" can constitute an "abnormal forest" and can predict, with a level of certainty, an abnormal ESP.

Figure 2:
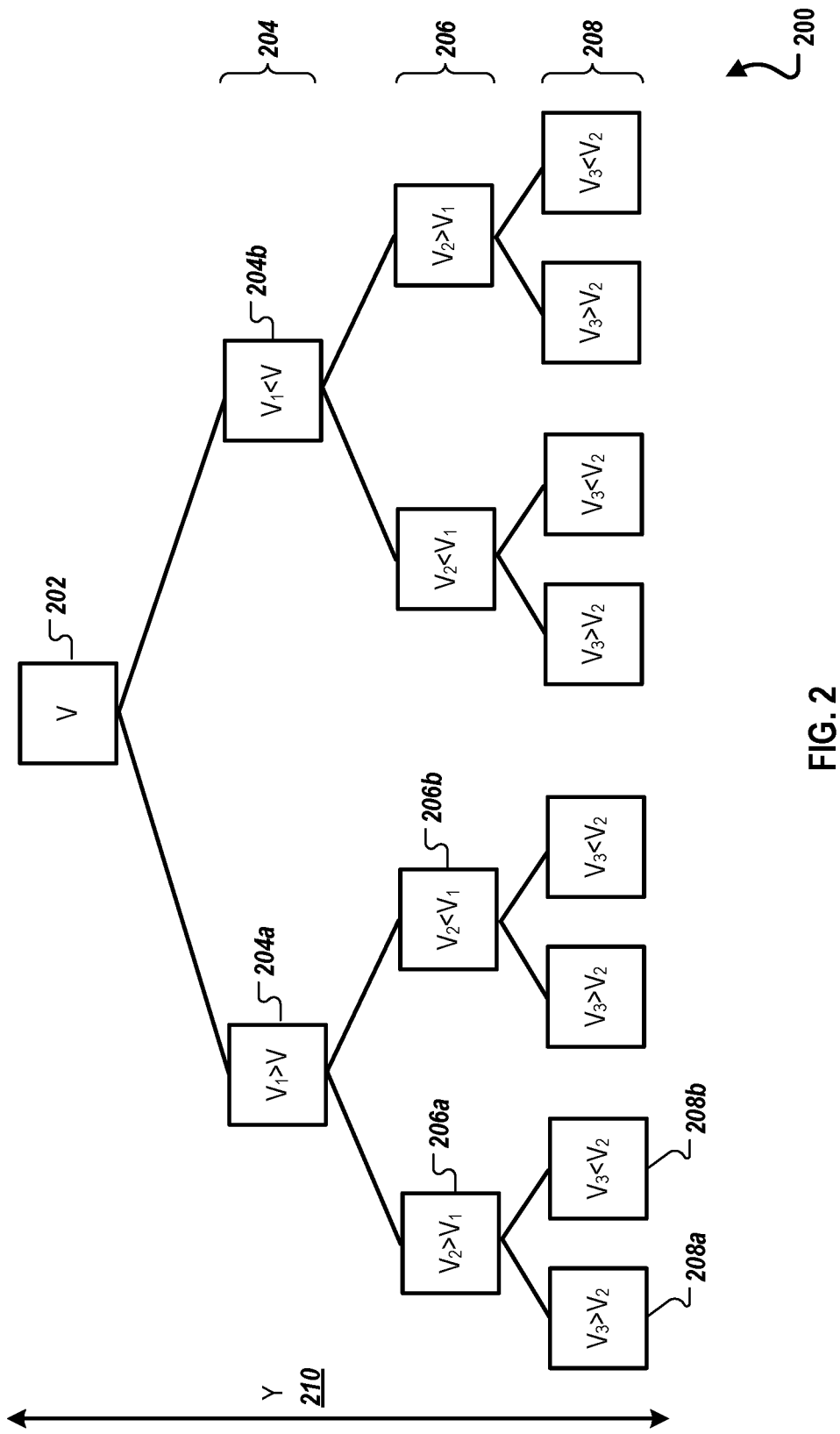
FIG. 2 is a tree diagram illustrating an example of a vibration values tree showing vibration value highs and lows, according to some implementations of the present disclosure.

FIG. 2 is a tree diagram illustrating an example of a vibration values tree 200 showing vibration value highs and lows, according to some implementations of the present disclosure. A root node 202 includes a base vibration value V. Child nodes 204 in the vibration values tree 200 show branches that relate a value $V_1$ with the value V in the root node 202. For example, the value $V_1$ in a child node 204a is greater than the value V taken from the root node, and the value $V_1$ in a child node 204b is less than the value V. Each grandchild node 206 in the vibration values tree 200 defines a relationship between a value $V_2$ and a value $V_1$ of a respective child node 204 that serves as a parent node. For example, the value $V_2$ in a grandchild node 206a is greater than the value $V_1$ taken from the child node 204a, and the value $V_2$ in a grandchild node 206b is less than the value $V_1$. Each great grandchild node 208 in the vibration values tree 200 defines a relationship between a value $V_3$ with the a value $V_2$ of a respective grandchild node 206 that serves as a parent node. For example, the value $V_3$ in a great grandchild node 208a is greater than the value $V_2$ taken from the grandchild node 206a, and the value $V_3$ in a great grandchild node 208b is less than the value $V_2$.

The vibration values tree 200 illustrates a key reactive variable for example vibration V and a disconnected theoretical limit 210 of $Y_1$. $Y_1$ can be considered the depth of the tree and an acceptable limit of certainty. If V has n–$Y_1$ highs, then a tree can also be used for pressure P. T, V, I∈{I.P, D.P, I.T, D,T}, meaning that temperature, volume, and current are subsets of the set that includes intake pressure (I.P), discharge pressure (D.P), intake temperature (I.T), and discharge temperature (D.T).

A classification of an abnormality of an ESP pump, for example, can be given by Equation (1):

$$\frac{\sum_{n=1}^{n=X} |K|}{n} = Y \qquad (1)$$

where x is the number of reactive variables for sensors X∈(T, V, I), for temperature (T), vibration (V), and current (I), where K is the observed high for each variable, and where $Y_1$ represents an acceptable threshold for each sensor X. Equation (1) can show that, if the number of highs for each variable X is equal to $Y_1$, then abnormality is indicated.

Figure 3:
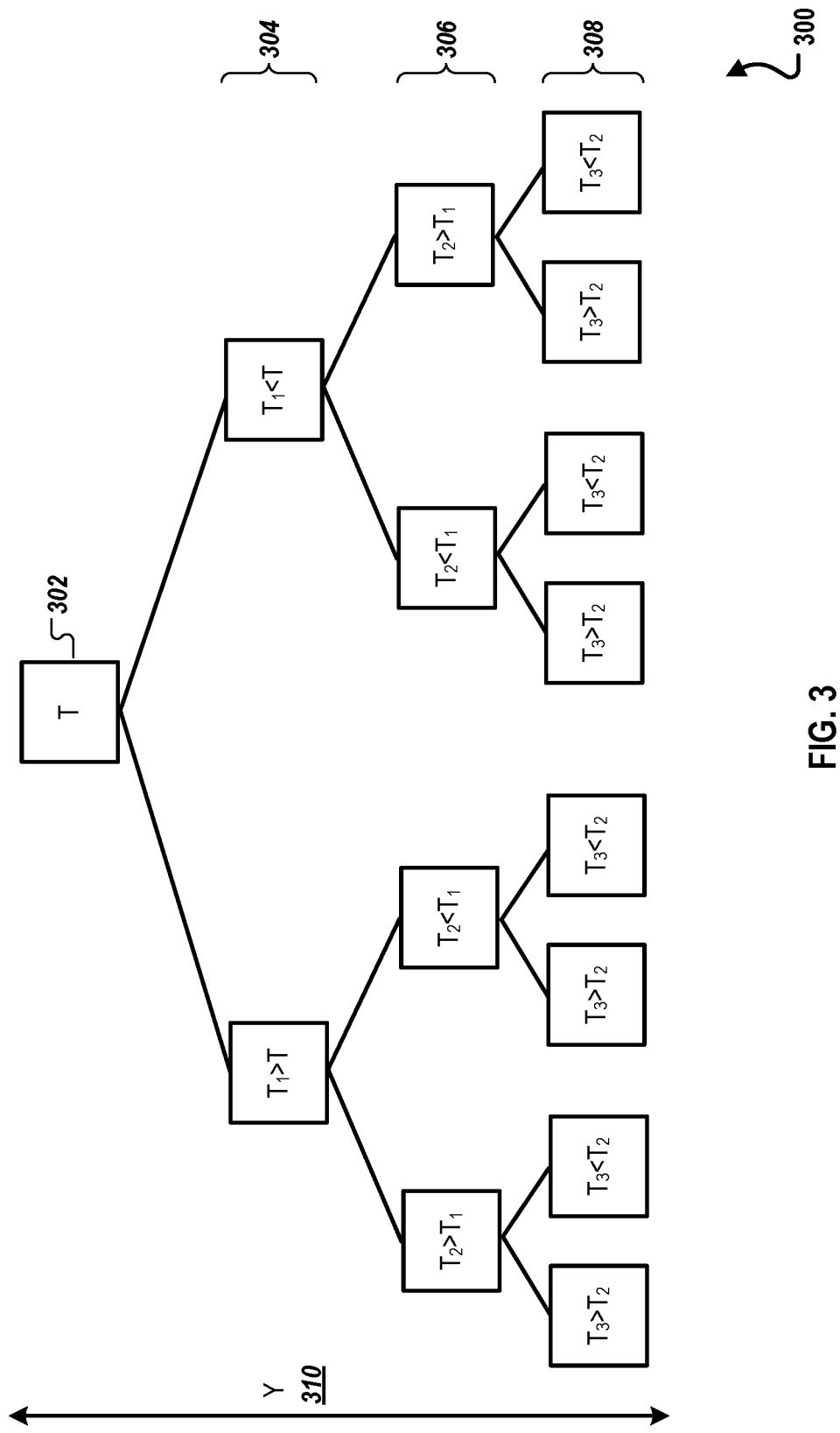
FIG. 3 is a tree diagram illustrating an example of a temperature values tree showing temperature value highs and lows, according to some implementations of the present disclosure.

FIG. 3 is a tree diagram illustrating an example of a temperature values tree 300 showing temperature value highs and lows, according to some implementations of the present disclosure. The temperature values tree 300 includes a disconnected theoretical limit 310 of $Y_2$ and a hierarchy of nodes showing relationships between temperatures. The hierarchy of nodes includes a root node 302, child nodes 304, grandchild nodes 306, and great grandchild nodes 308.

A pattern recognition module can be developed and applied to ESP sensor data on a variety of wells. The sensor data can include key ESP parameter data that describe the state of the pump, such as using the following readings:

TABLE 1

| | Sensor Data |
|---|---|
| 1 | ESP Intake Pressure |
| 2 | ESP Discharge Pressure |
| 3 | Frequency |
| 4 | Motor Vibration |
| 5 | Current |
| 6 | Motor Temperature |

Figure 4:
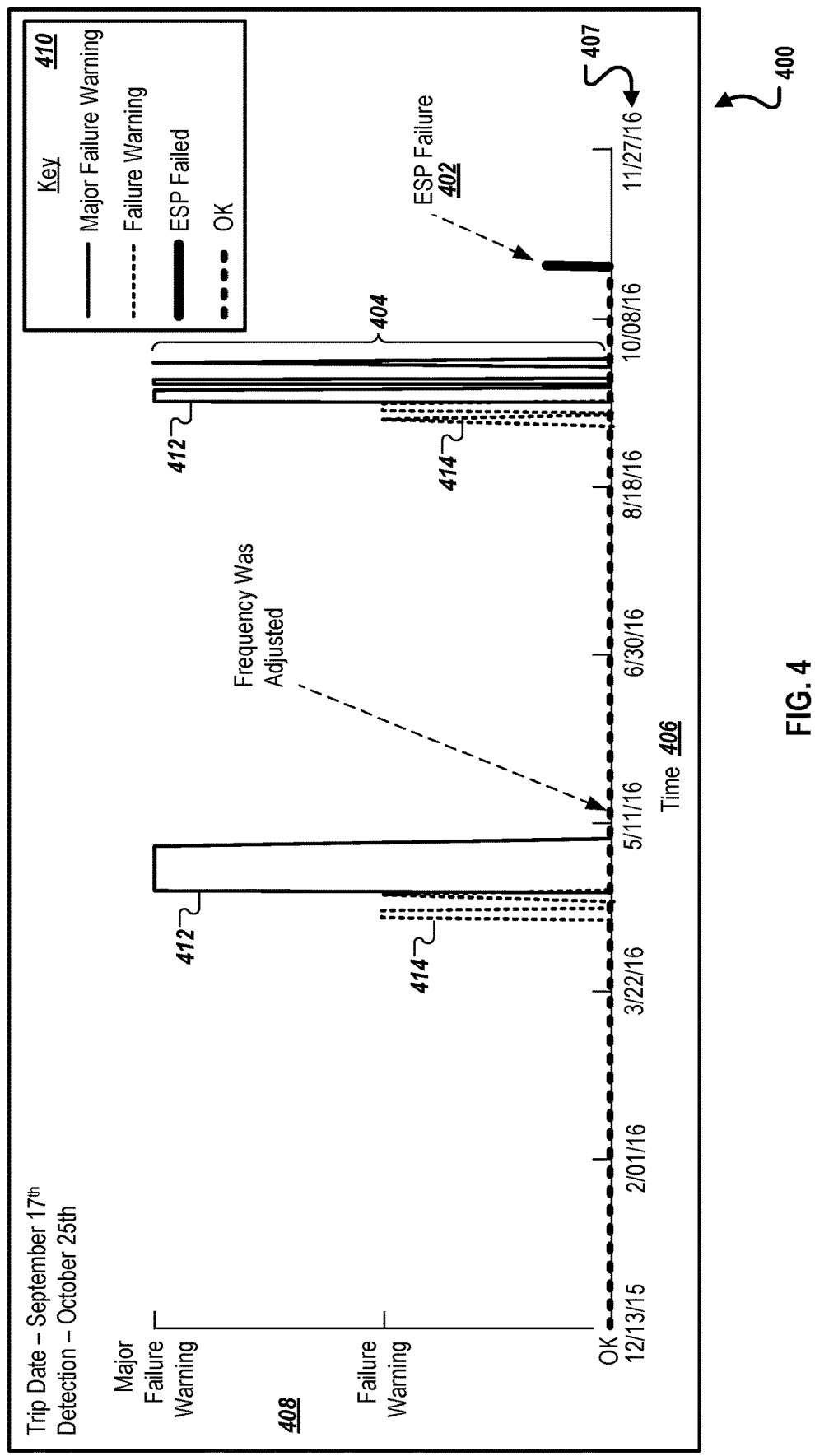
FIG. 4 is a diagram of an example timeline of warnings and failures, according to some implementations of the present disclosure.

FIG. 4 is a diagram of an example timeline 400 of warnings and failures, according to some implementations of the present disclosure. In some implementations, the timeline 400 can be presented in a user interface, highlighting an indication of a failure 402 and warnings 404 that preceded the failure 402. The timeline 400 can serve as, and be presented as, a report, such as generated after selection, by a user, from a group of past failures 402.

In some implementations, actual dates 407 on a time 406 axis can be replaced with relative day indicators, such as labeling the failure 402 as being at day 0 on the time 406 axis, and labeling days leading up to the date of the failure 402 with numeric values, such as negative day numbers relative to zero day of the failure 402. In some implementations, multiple timelines 400 can be displayed side-by-side, superimposed, or visually averaged in order to present failure patterns.

Warnings 404 that occur over time 406 can be categorized by warning type and severity 408, showing heights of warnings on the timeline 400 that are either major failure warnings or minor failure warnings. For example, as indicated in a key 410, solid lines depict major failure warnings 412, and dashed lines depict minor failure warnings 414. The failure 402 can be indicated using a thicker line. Other ways of presenting differences in failure types can include, for example, the use of different colors.

In some implementations, the severity of a warning (and the height of the line relative to the severity 408 axis) can depend on values of one or more sensors. For example, when a rate of change, an amount of change, or a percentage of change in a temperature or vibration sensor exceeds a threshold for a major failure warning, then the line can be a solid line with a height relative to the severity 408 axis at the time 406 of the sensor reading(s).

Figure 5:
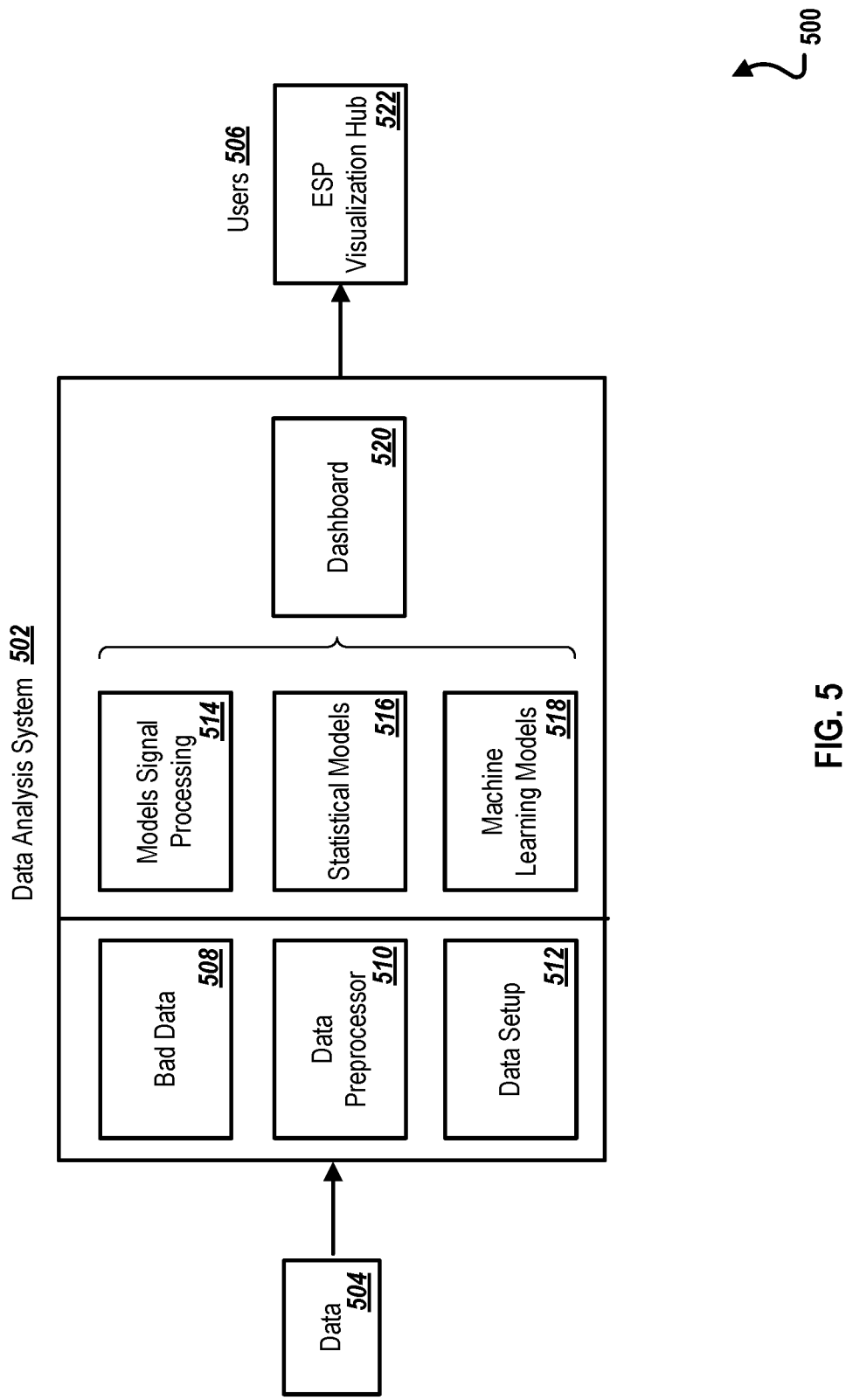
FIG. 5 is a block diagram illustrating an example architecture for providing information regarding electrical submersible pumps (ESP) failures, according to some implementations of the present disclosure.

FIG. 5 is a block diagram illustrating an example architecture 500 for providing information regarding ESP failures, according to some implementations of the present disclosure. The architecture 500 includes a data analysis system 502 that is configured to analyze data 504, such as historical sensor readings, historical failure information, and current conditions at ESPs. The result of the analysis can be to provide information to users 506, including information that identifies past failures (and related alarm information) and predicts future failures, for example at ESPs currently in operation. In some implementations, the data analysis system 502 can include (or be implemented using) a high-performance language for technical computing such as MATLAB.

During processing, the data analysis system 502 can use a data preprocessor 510 to process the data 504. The data preprocessor 510 can identify, from the data 504, bad data 508 that can include, for example, data that is not pertinent for the analysis and identification of ESP failures, as well as data that may be erroneous. A data setup module 512 can allow the user of the data analysis system 502 to control how information is to be processed, including setting parameters and preferences as to how the information is to be processed and ultimately presented to the users 506.

Processing performed by the data analysis system 502 can include models signal processing 514 that uses statistical models 516 in combination with received data 504 to predict potential ESP failures. Processing can also rely on machine learning models 518 and associated machine learning algorithms in order to predict potential ESP failures. Information identifying predicted potential ESP failures, can be collected by a dashboard module 520. An ESP visualization hub 522 can receive information from the dashboard module 520 in order to present predicted ESP failures and other information to the users 506.

Figure 6:
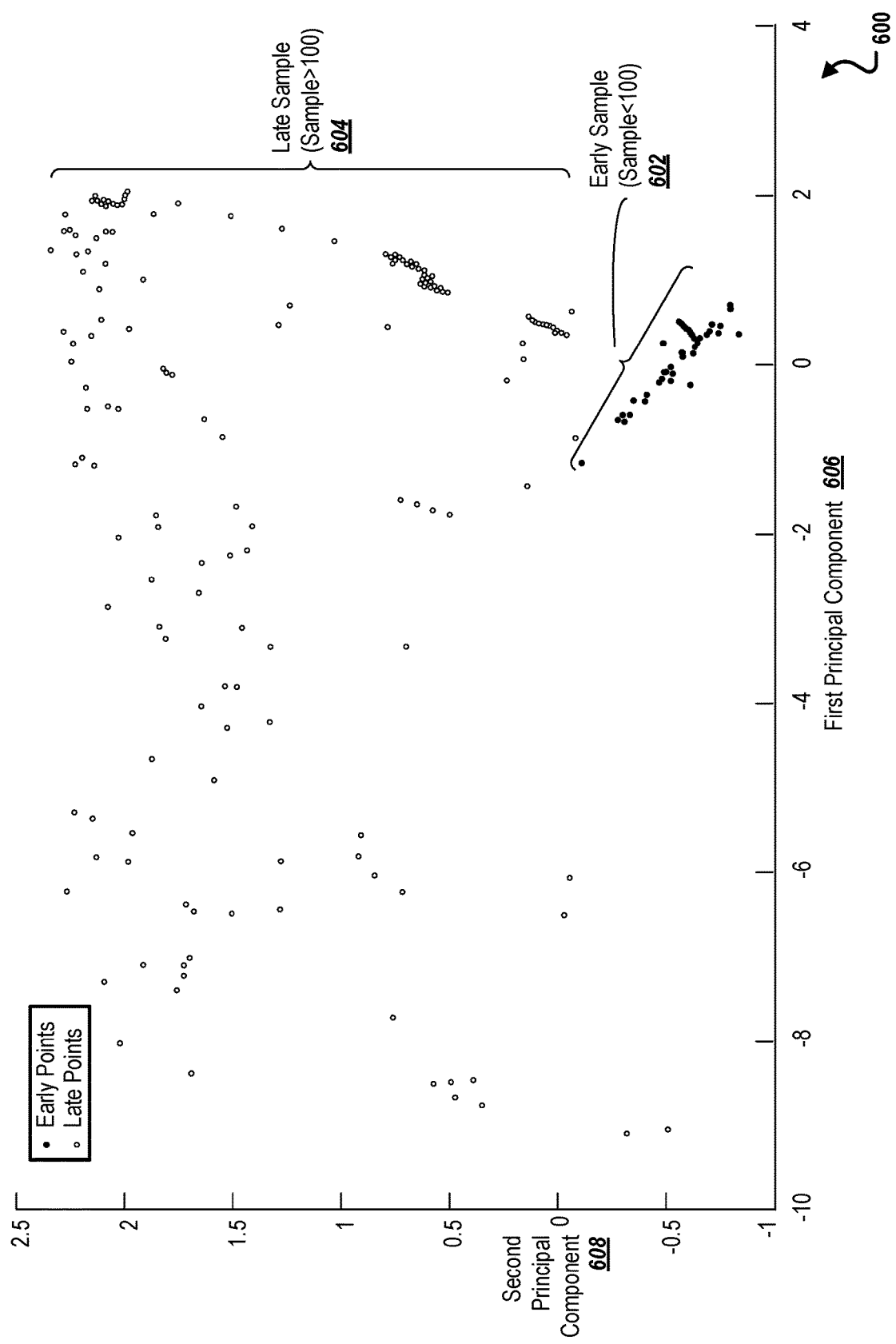
FIG. 6 is a scatter plot diagram illustrating an example scatter plot that includes patterns of early and late alarms associated with ESP failures, according to some implementations of the present disclosure.

FIG. 6 is a scatter plot diagram illustrating an example scatter plot 600 that includes patterns of early and late alarms associated with ESP failures, according to some implementations of the present disclosure. The scatter plot 600 includes fewer than a hundred early sample plots 602 that indicate early alarms associated with ESP failures. The scatter plot 600 also includes more than a hundred late sample plots 604 that indicate late alarms associated with ESP failures. The position of any one plot 602 or 604 depends on values of a first principal component 606 and a second principal component 608, each of which can be different types of alarms, such as temperature and pressure. A user to whom the scatter plot 600 is presented can see, for example, relationships between early and late sensor warnings.

Figure 7:
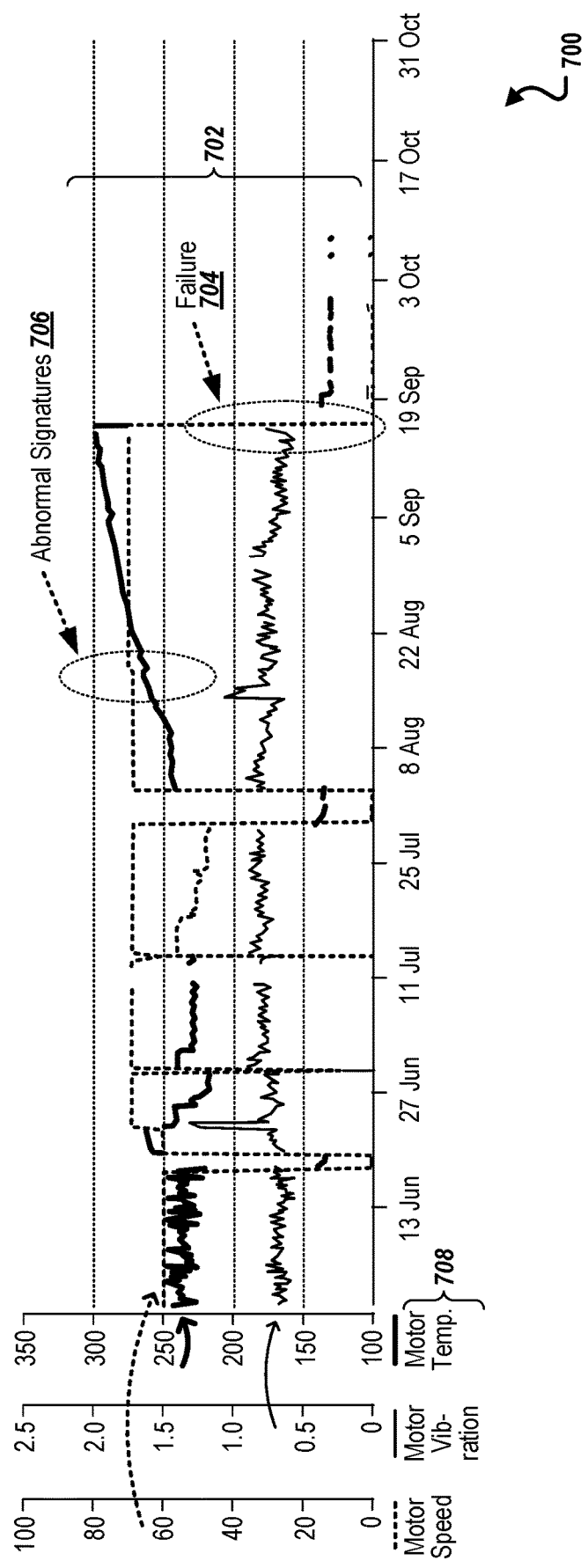
FIG. 7 is a timeline diagram of an example timeline that includes occurrence dates of sensor readings (including detected alarms) and a subsequent failure, according to some implementations of the present disclosure.

FIG. 7 is a timeline diagram of an example timeline 700 that includes occurrence dates of sensor readings 702 (including detected alarms) and a subsequent failure 704, according to some implementations of the present disclosure. For example, the failure 704 is shown to be occurring approximately one month after the occurrence of abnormal signatures 706 from different ESP sensors 708. The example shown in the timeline 700 can be one of many cases that can be avoided (for example, by correcting ESP settings) to prevent future failures and production loss. Avoiding such failures can be accomplished, for example, by detecting one or more patterns of abnormal sensor readings and subsequent failures 704 in the timeline 700 as well as other cases that have similar relationships among sensor readings and ESP failures.

Figure 8:
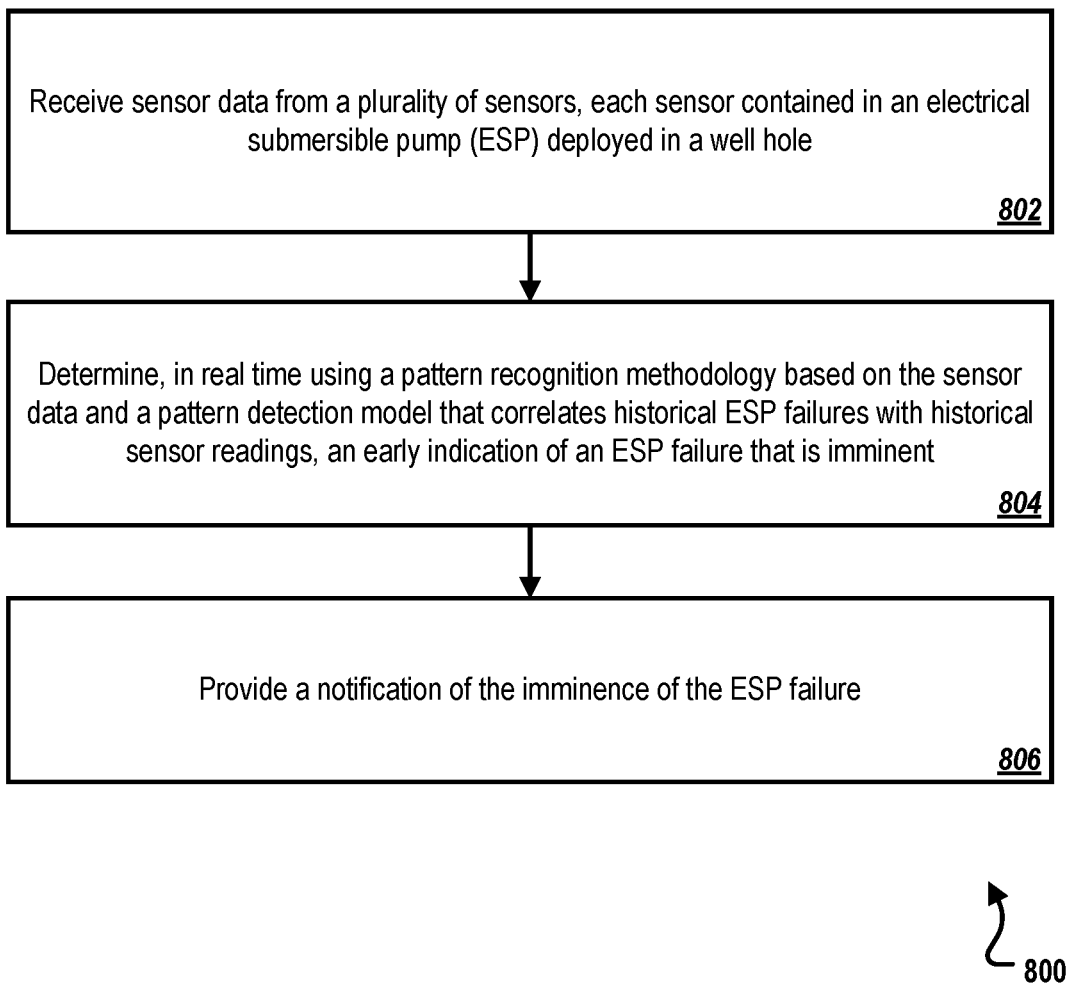
FIG. 8 is a flowchart of an example method for providing a notification of the imminence of the ESP failure, according to some implementations of the present disclosure.

FIG. 8 is a flowchart of an example method 800 for providing a notification of the imminence of the ESP failure, according to some implementations of the present disclosure. For clarity of presentation, the description that follows generally describes method 800 in the context of the other figures in this description. However, it will be understood that method 800 may be performed, for example, by any suitable system, environment, software, and hardware, or a combination of systems, environments, software, and hardware, as appropriate. In some implementations, various steps of method 800 can be run in parallel, in combination, in loops, or in any order.

At 802, sensor data is received from a plurality of sensors contained in an electrical submersible pump (ESP) deployed in a well hole. For example, the pump data failure pattern recognition module 102 can receive input time series data 104. The received data can include, for example, the sensor readings 702 (including detected alarms, such as warnings 404) that occur before a subsequent failure 704. The sensor readings can also include, for example, sensor data such as motor temperature data, current data, vibration data, intake pressure data, and discharge pressure data. From 802, method 800 proceeds to 804.

At 804, an early indication of an ESP failure that is imminent is determined in real time using a pattern recognition methodology based on the sensor data and a pattern detection model that correlates historical ESP failures with historical sensor readings. As an example, the pump data failure pattern recognition module 102 can use the received input time series data 104 to determine that a failure is imminent. The determination can be made, for example, by detecting the occurrence of a larger than usual number of warnings 404, or sensor readings 702 that provide the abnormal signatures 706, or some combination.

In some implementations, method 800 can include training the pattern detection model. For example, the pattern detection model can be trained to understand normal behaviors, abnormal behaviors, and critical events of each sensor (for example, the abnormal signatures 706). The training can be based on an analysis of a historical behavior of failed pumps, historical sensor readings, a failure database, and a database of factors for different ESP types. For example, the training can be based on a combination of the models signals processing 514, the statistical models 516, and machine learning models 518. Potential ESP failures can be classified under low warnings (for example, warnings 404) or high warnings (for example, major failure warnings 412) based on a severity of an alarm received from a particular sensor of a particular ESP type. The classification of a particular potential ESP failure can be based on a single sensor or multiple sensors. The information can be stored for each potential ESP failure in the pattern detection model (for example, for use by the pump data failure pattern recognition module 102).

In some implementations, classifying a given potential ESP failure can include considering patterns of sensor readings for one or more sensors generating a wide range of consistent highs or consistent lows. For example, failure patterns can be based on patterns such as those shown in the timeline 400.

In some implementations, determining the early indication of an ESP failure can include determining an abnormal forest of trees based on a time-related existence of abnormal trees. For example, determining an abnormal forest of trees can include considering the acceptable limits of each sensor, including making the determination based on the vibration values tree 200, the temperature values tree 300, and other trees. From 804, method 800 proceeds to 806.

At 806, a notification of the imminence of the ESP failure is provided. For example, the pump data failure pattern recognition module 102 can provide the failure/trip indication 106. Providing the indication can be done, for example, by the dashboard module 520 based on information received from the models signals processing 514, the statistical models 516, and machine learning models 518. Information about the imminent ESP failure can be provided to the ESP visualization hub 522 for presentation to a user. In some implementations, the ESP failure can be a burnt motor, a broken shaft, or one of various hydrogen sulfide ($H_2S$) problems. After 806, method 800 stops.

In some implementations, method 800 further includes generating tree for a given sensor, the tree including a tree pattern of sensor values for the given sensor and acceptable limits for the sensor values. For example, the pump data failure pattern recognition module 102 can generate the sensor-based trees such as the vibration values tree 200 and temperature values tree 300.

Figure 9:
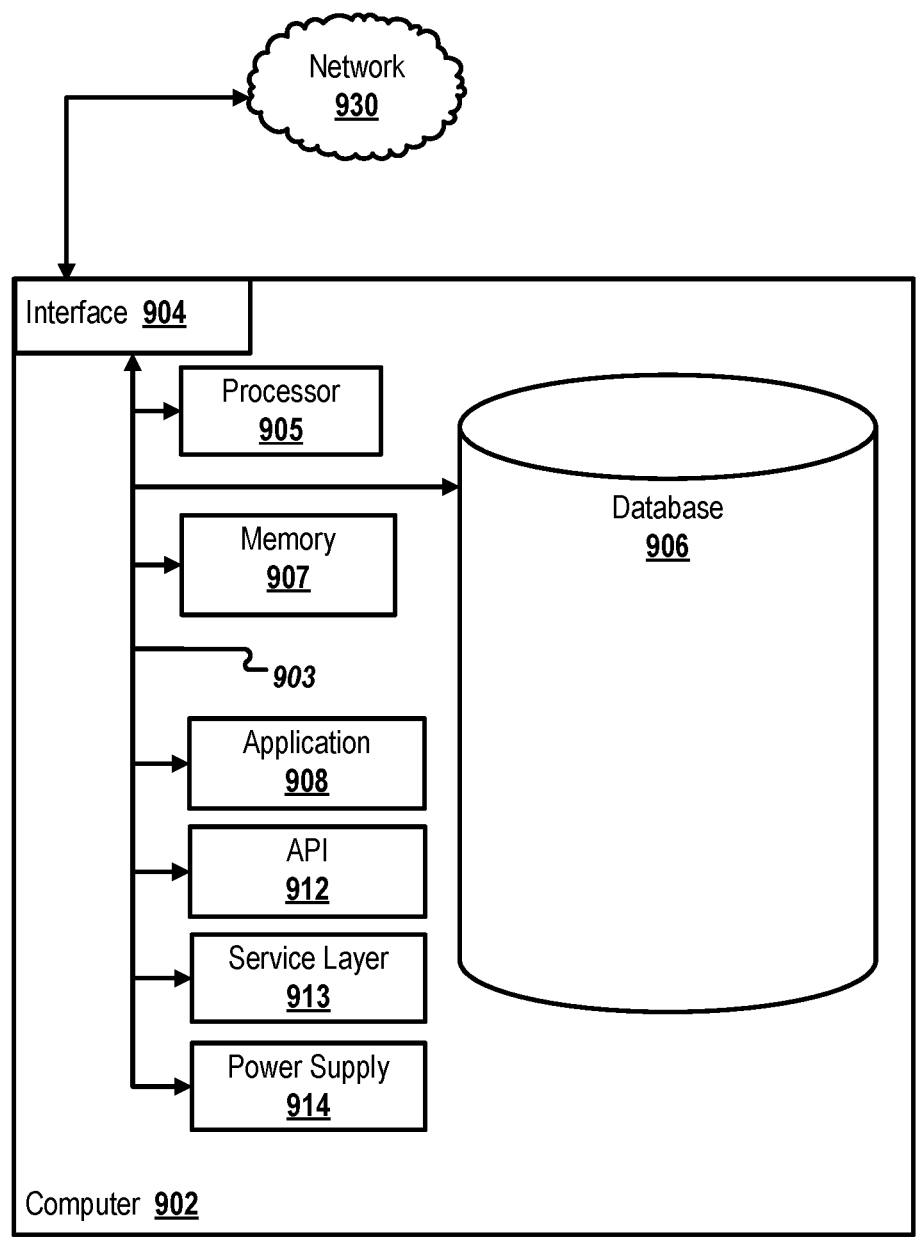
FIG. 9 is a block diagram illustrating an example computer system used to provide computational functionalities associated with described algorithms, methods, functions, processes, flows, and procedures as described in the instant disclosure, according to some implementations of the present disclosure.

FIG. 9 is a block diagram of an example computer system 900 used to provide computational functionalities associated with described algorithms, methods, functions, processes, flows, and procedures, as described in the instant disclosure, according to some implementations of the present disclosure. The illustrated computer 902 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 902 may comprise a computer that includes an input device, such as a keypad, keyboard, touch screen, or other device that can accept user information, and an output device that conveys information associated with the operation of the computer 902, including digital data, visual, or audio information (or a combination of information), or a graphical-type user interface (UI) (or GUI).

The computer 902 can serve in a role as a client, network component, a server, a database or other persistency, or any other component (or a combination of roles) of a computer system for performing the subject matter described in the instant disclosure. The illustrated computer 902 is communicably coupled with a network 930. In some implementations, one or more components of the computer 902 may be configured to operate within environments, including cloud-computing-based, local, global, or other environment (or a combination of environments).

At a high level, the computer 902 is an electronic computing device operable to receive, transmit, process, store, or manage data and information associated with the described subject matter. According to some implementations, the computer 902 may also include or be communicably coupled with an application server, email server, web server, caching server, streaming data server, or other server (or a combination of servers).

The computer 902 can receive requests over network 930 from a client application (for example, executing on another computer 902) and respond to the received requests by processing the received requests using an appropriate software application(s). In addition, requests may also be sent to the computer 902 from internal users (for example, from a command console or by other appropriate access method), external or third-parties, other automated applications, as well as any other appropriate entities, individuals, systems, or computers.

Each of the components of the computer 902 can communicate using a system bus 903. In some implementations, any or all of the components of the computer 902, hardware or software (or a combination of both hardware and software), may interface with each other or the interface 904 (or a combination of both), over the system bus 903 using an application programming interface (API) 912 or a service layer 913 (or a combination of the API 912 and service layer 913). The API 912 may include specifications for routines, data structures, and object classes. The API 912 may be either computer-language independent or dependent and refer to a complete interface, a single function, or even a set of APIs. The service layer 913 provides software services to the computer 902 or other components (whether or not illustrated) that are communicably coupled to the computer 902. The functionality of the computer 902 may be accessible for all service consumers using this service layer.

Software services, such as those provided by the service layer 913, provide reusable, defined functionalities through a defined interface. For example, the interface may be software written in JAVA, C++, or other suitable language providing data in extensible markup language (XML) format or other suitable format. While illustrated as an integrated component of the computer 902, alternative implementations may illustrate the API 912 or the service layer 913 as stand-alone components in relation to other components of the computer 902 or other components (whether or not illustrated) that are communicably coupled to the computer 902. Moreover, any or all parts of the API 912 or the service layer 913 may be implemented as child or sub-modules of another software module, enterprise application, or hardware module without departing from the scope of this disclosure.

The computer 902 includes an interface 904. Although illustrated as a single interface 904 in FIG. 9, two or more interfaces 904 may be used according to particular needs, desires, or particular implementations of the computer 902. The interface 904 is used by the computer 902 for communicating with other systems that are connected to the network 930 (whether illustrated or not) in a distributed environment. Generally, the interface 904 comprises logic encoded in software or hardware (or a combination of software and hardware) and is operable to communicate with the network 930. More specifically, the interface 904 may comprise software supporting one or more communication protocols associated with communications such that the network 930 or interface's hardware is operable to communicate physical signals within and outside of the illustrated computer 902.

The computer 902 includes a processor 905. Although illustrated as a single processor 905 in FIG. 9, two or more processors may be used according to particular needs, desires, or particular implementations of the computer 902. Generally, the processor 905 executes instructions and manipulates data to perform the operations of the computer 902 and any algorithms, methods, functions, processes, flows, and procedures as described in the instant disclosure.

The computer 902 also includes a database 906 that can hold data for the computer 902 or other components (or a combination of both) that can be connected to the network 930 (whether illustrated or not). For example, database 906 can be an in-memory, conventional, or other type of database storing data consistent with this disclosure. In some implementations, database 906 can be a combination of two or more different database types (for example, a hybrid in-memory and conventional database) according to particular needs, desires, or particular implementations of the computer 902 and the described functionality. Although illustrated as a single database 906 in FIG. 9, two or more databases (of the same or combination of types) can be used according to particular needs, desires, or particular implementations of the computer 902 and the described functionality. While database 906 is illustrated as an integral component of the computer 902, in alternative implementations, database 906 can be external to the computer 902.

The computer 902 also includes a memory 907 that can hold data for the computer 902 or other components (or a combination of both) that can be connected to the network 930 (whether illustrated or not). Memory 907 can store any data consistent with this disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same or combination of types) can be used according to particular needs, desires, or particular implementations of the computer 902 and the described functionality. While memory 907 is illustrated as an integral component of the computer 902, in alternative implementations, memory 907 can be external to the computer 902.

The application 908 is an algorithmic software engine providing functionality according to particular needs, desires, or particular implementations of the computer 902, particularly with respect to functionality described in this disclosure. For example, application 908 can serve as one or more components, modules, or applications. Further, although illustrated as a single application 908, the application 908 may be implemented as multiple applications 908 on the computer 902. In addition, although illustrated as integral to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion or management circuits (including recharging, standby, or other power management functionality). In some implementations, the power-supply 914 can include a power plug to allow the computer 902 to be plugged into a wall socket or other power source to, for example, power the computer 902 or recharge a rechargeable battery.

There may be any number of computers 902 associated with, or external to, a computer system containing computer 902, each computer 902 communicating over network 930. Further, the term "client," "user," and other appropriate terminology may be used interchangeably, as appropriate, without departing from the scope of this disclosure. Moreover, this disclosure contemplates that many users may use one computer 902, or that one user may use multiple computers 902.

Described implementations of the subject matter can include one or more features, alone or in combination.

For example, in a first implementation, a computer-implemented method, comprising: receiving sensor data from a plurality of sensors, each sensor contained in an ESP deployed in a well hole; determining, in real time using a pattern recognition methodology based on the sensor data and a pattern detection model that correlates historical ESP failures with historical sensor readings, an early indication of an ESP failure that is imminent; and providing a notification of the imminence of the ESP failure.

The foregoing and other described implementations can each, optionally, include one or more of the following features:

A first feature, combinable with any of the following features, wherein the sensor data includes motor temperature data, current data, vibration data, intake pressure data, and discharge pressure data.

A second feature, combinable with any of the previous or following features, the method further comprising: training the pattern detection model to understand normal behaviors, abnormal behaviors, and critical events of each sensor, wherein the training is based on an analysis of a historical behavior of failed pumps, a historical sensor readings, a failure database, and a database of factors for different ESP types; classifying potential ESP failures under low warnings or high warnings based on a severity of an alarm received from a particular sensor of a particular ESP type, wherein the classifying a particular potential ESP failure is based on a single sensor or multiple sensors; and storing information for each potential ESP failure in the pattern detection model.

A third feature, combinable with any of the previous or following features, wherein classifying a given potential ESP failure includes considering patterns of sensor readings for one or more sensors generating a wide range of consistent highs or consistent lows.

A fourth feature, combinable with any of the previous or following features, the method further comprising generating tree for a given sensor, the tree including a tree pattern of sensor values for the given sensor and acceptable limits for the sensor values.

A fifth feature, combinable with any of the previous or following features, wherein determining the early indication of an ESP failure includes determining an abnormal forest of trees based on a time-related existence of abnormal trees, wherein determining an abnormal forest of trees includes considering the acceptable limits of each sensor.

A sixth feature, combinable with any of the previous or following features, wherein the ESP failure is one of a burnt motor, a broken shaft, or one or more hydrogen sulfide ($H_2S$) problems.

In a second implementation, a non-transitory, computer-readable medium storing one or more instructions executable by a computer system to perform operations comprising: receiving sensor data from a plurality of sensors, each sensor contained in an ESP deployed in a well hole; determining, in real time using a pattern recognition methodology based on the sensor data and a pattern detection model that correlates historical ESP failures with historical sensor readings, an early indication of an ESP failure that is imminent; and providing a notification of the imminence of the ESP failure.

The foregoing and other described implementations can each, optionally, include one or more of the following features:

A first feature, combinable with any of the following features, wherein the sensor data includes motor temperature data, current data, vibration data, intake pressure data, and discharge pressure data.

A second feature, combinable with any of the previous or following features, the operations further comprising: training the pattern detection model to understand normal behaviors, abnormal behaviors, and critical events of each sensor, wherein the training is based on an analysis of a historical behavior of failed pumps, a historical sensor readings, a failure database, and a database of factors for different ESP types; classifying potential ESP failures under low warnings or high warnings based on a severity of an alarm received from a particular sensor of a particular ESP type, wherein the classifying a particular potential ESP failure is based on a single sensor or multiple sensors; and storing information for each potential ESP failure in the pattern detection model.

A third feature, combinable with any of the previous or following features, wherein classifying a given potential ESP failure includes considering patterns of sensor readings for one or more sensors generating a wide range of consistent highs or consistent lows.

A fourth feature, combinable with any of the previous or following features, the operations further comprising generating tree for a given sensor, the tree including a tree pattern of sensor values for the given sensor and acceptable limits for the sensor values.

A fifth feature, combinable with any of the previous or following features, wherein determining the early indication of an ESP failure includes determining an abnormal forest of trees based on a time-related existence of abnormal trees, wherein determining an abnormal forest of trees includes considering the acceptable limits of each sensor.

A sixth feature, combinable with any of the previous or following features, wherein the ESP failure is one of a burnt motor, a broken shaft, or one or more hydrogen sulfide ($H_2S$) problems.

In a third implementation, a computer-implemented system, comprising: one or more processors; and a non-transitory computer-readable storage medium coupled to the one or more processors and storing programming instructions for execution by the one or more processors, the programming instructions instruct the one or more processors to perform operations comprising: receiving sensor data from a plurality of sensors, each sensor contained in an ESP deployed in a well hole; determining, in real time using a pattern recognition methodology based on the sensor data and a pattern detection model that correlates historical ESP failures with historical sensor readings, an early indication of an ESP failure that is imminent; and providing a notification of the imminence of the ESP failure.

The foregoing and other described implementations can each, optionally, include one or more of the following features:

A first feature, combinable with any of the following features, wherein the sensor data includes motor temperature data, current data, vibration data, intake pressure data, and discharge pressure data.

A second feature, combinable with any of the previous or following features, the operations further comprising: training the pattern detection model to understand normal behaviors, abnormal behaviors, and critical events of each sensor, wherein the training is based on an analysis of a historical behavior of failed pumps, a historical sensor readings, a failure database, and a database of factors for different ESP types; classifying potential ESP failures under low warnings or high warnings based on a severity of an alarm received from a particular sensor of a particular ESP type, wherein the classifying a particular potential ESP failure is based on a single sensor or multiple sensors; and storing information for each potential ESP failure in the pattern detection model.

A third feature, combinable with any of the previous or following features, wherein classifying a given potential ESP failure includes considering patterns of sensor readings for one or more sensors generating a wide range of consistent highs or consistent lows.

A fourth feature, combinable with any of the previous or following features, the operations further comprising generating tree for a given sensor, the tree including a tree pattern of sensor values for the given sensor and acceptable limits for the sensor values.

A fifth feature, combinable with any of the previous or following features, wherein determining the early indication of an ESP failure includes determining an abnormal forest of trees based on a time-related existence of abnormal trees, wherein determining an abnormal forest of trees includes considering the acceptable limits of each sensor.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital video disc (DVD), CD-ROM, DVD+/−R, DVD-RAM, DVD-ROM, HD-DVD, and BLURAY, and other optical memory technologies. The memory may store various objects or data, including caches, classes, frameworks, applications, modules, backup data, jobs, web pages, web page templates, data structures, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with some implementations of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

Cluster file system involved in this invention can be any file system type accessible from multiple servers for read and update. Locking or consistency tracking is not necessary in this invention since the locking of exchange file system can be done at application layer. Furthermore, Unicode data files are different from non-Unicode data files.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving sensor data from a plurality of sensors, each sensor contained in an electrical submersible pump (ESP) deployed in a well hole;
   generating a pattern detection model that correlates historical ESP failures with historical sensor readings corresponding to each sensor ESP type of ESP sensors of different ESP types, an early indication of an ESP failure of a particular ESP of a particular ESP type that is imminent, including:
      generating a vibration values tree for each different sensor ESP type including parent-child nodes representing vibration high and low values, wherein the vibration values tree provides a key reactive variable identifying a depth of the vibration values tree and an acceptable limit of certainty; and
      generating a temperature values tree for each different sensor ESP type including parent-child nodes representing temperature high and low values;

determining, in real time using a pattern recognition methodology based on the sensor data and the pattern detection model; and providing a notification of the imminence of the ESP failure of the particular ESP of the particular ESP type.

2. The computer-implemented method of claim 1, wherein the sensor data includes motor temperature data, current data, vibration data, intake pressure data, and discharge pressure data.

3. The computer-implemented method of claim 1, further comprising:

training the pattern detection model to understand normal behaviors, abnormal behaviors, and critical events of each different ESP type, including analyzing and correlating historical data from separate sources including a historical behavior of failed pumps of sensors of the different ESP types, a historical sensor readings database, an ESP failure database, and a database of factors for the different ESP types;

classifying potential ESP failures according to warning severities based on a severity of an alarm received from a particular sensor of a particular ESP type, wherein the classifying a particular potential ESP failure is based on a single sensor or multiple sensors; and storing information for each potential ESP failure in the pattern detection model.

4. The computer-implemented method of claim 1, wherein classifying a given potential ESP failure includes considering patterns of sensor readings for one or more sensors that have generated a range of consistent highs or consistent lows included in the historical sensor readings of failed pumps.

5. The computer-implemented method of claim 4, further comprising generating a tree for a given sensor, the tree including a tree pattern of sensor values for the given sensor and normal thresholds for the sensor values.

6. The computer-implemented method of claim 5, wherein determining the early indication of an ESP failure includes determining an abnormal forest of trees based on a time-related existence of abnormal trees, wherein determining an abnormal forest of trees includes considering the normal thresholds of each sensor.

7. The computer-implemented method of claim 1, wherein the ESP failure is one of a burnt motor, a broken shaft, or one or more hydrogen sulfide (H2S) problems.

8. A non-transitory, computer-readable medium storing one or more instructions executable by a computer system to perform operations comprising:

receiving sensor data from a plurality of sensors, each sensor contained in an electrical submersible pump (ESP) deployed in a well hole;

generating a pattern detection model that correlates historical ESP failures with historical sensor readings corresponding to each sensor ESP type of ESP sensors of different ESP types, an early indication of an ESP failure of a particular ESP of a particular ESP type that is imminent, including:

generating a vibration values tree for each different sensor ESP type including parent-child nodes representing vibration high and low values, wherein the vibration values tree provides a key reactive variable identifying a depth of the vibration values tree and an acceptable limit of certainty; and generating a temperature values tree for each different sensor ESP type including parent-child nodes representing temperature high and low values;

determining, in real time using a pattern recognition methodology based on the sensor data and the pattern detection model; and providing a notification of the imminence of the ESP failure of the particular ESP of the particular ESP type.

9. The non-transitory, computer-readable medium of claim 8, wherein the sensor data includes motor temperature data, current data, vibration data, intake pressure data, and discharge pressure data.

10. The non-transitory, computer-readable medium of claim 8, the operations further comprising:

training the pattern detection model to understand normal behaviors, abnormal behaviors, and critical events of each different ESP type, including analyzing and correlating historical data from separate sources including a historical behavior of failed pumps of sensors of the different ESP types, a historical sensor readings database, an ESP failure database, and a database of factors for the different ESP types;

classifying potential ESP failures according to warning severities based on a severity of an alarm received from a particular sensor of a particular ESP type, wherein the classifying a particular potential ESP failure is based on a single sensor or multiple sensors; and storing information for each potential ESP failure in the pattern detection model.

11. The non-transitory, computer-readable medium of claim 8, wherein classifying a given potential ESP failure includes considering patterns of sensor readings for one or more sensors that have generated a range of consistent highs or consistent lows included in historical behaviors of failed pumps.

12. The non-transitory, computer-readable medium of claim 11, the operations further comprising generating a tree for a given sensor, the tree including a tree pattern of sensor values for the given sensor and normal thresholds for the sensor values.

13. The non-transitory, computer-readable medium of claim 12, wherein determining the early indication of an ESP failure includes determining an abnormal forest of trees based on a time-related existence of abnormal trees, wherein determining an abnormal forest of trees includes considering the normal thresholds of each sensor.

14. The non-transitory, computer-readable medium of claim 8, wherein the ESP failure is one of a burnt motor, a broken shaft, or one or more hydrogen sulfide (H2S) problems.

15. A computer-implemented system, comprising:

one or more processors; and a non-transitory computer-readable storage medium coupled to the one or more processors and storing programming instructions for execution by the one or more processors, the programming instructions instruct the one or more processors to perform operations comprising:

receiving sensor data from a plurality of sensors, each sensor contained in an electrical submersible pump (ESP) deployed in a well hole;

generating a pattern detection model that correlates historical ESP failures with historical sensor readings corresponding to each sensor ESP type of ESP sensors of different ESP types, an early indication of an ESP failure of a particular ESP of a particular ESP type that is imminent, including:

generating a vibration values tree for each different sensor ESP type including parent-child nodes representing vibration high and low values, wherein the vibration values tree provides a key reactive variable identifying a depth of the vibration values tree and an acceptable limit of certainty; and generating a temperature values tree for each different sensor ESP type including parent-child nodes representing temperature high and low values;

determining, in real time using a pattern recognition methodology based on the sensor data and the pattern detection model; and providing a notification of the imminence of the ESP failure of the particular ESP of the particular ESP type.

16. The computer-implemented system of claim 15, wherein the sensor data includes motor temperature data, current data, vibration data, intake pressure data, and discharge pressure data.

17. The computer-implemented system of claim 15, the operations further comprising:

training the pattern detection model to understand normal behaviors, abnormal behaviors, and critical events of each different ESP type, including analyzing and correlating historical data from separate sources including a historical behavior of failed pumps of sensors of the different ESP types, a historical sensor readings database, an ESP failure database, and a database of factors for the different ESP types;

classifying potential ESP failures according to warning severities based on a severity of an alarm received from a particular sensor of a particular ESP type, wherein the classifying a particular potential ESP failure is based on a single sensor or multiple sensors; and storing information for each potential ESP failure in the pattern detection model.

18. The computer-implemented system of claim 15, wherein classifying a given potential ESP failure includes considering patterns of sensor readings for one or more sensors that have generated a range of consistent highs or consistent lows included in historical behaviors of failed pumps.

19. The computer-implemented system of claim 18, the operations further comprising generating a tree for a given sensor, the tree including a tree pattern of sensor values for the given sensor and normal thresholds for the sensor values.

20. The computer-implemented system of claim 19, wherein determining the early indication of an ESP failure includes determining an abnormal forest of trees based on a time-related existence of abnormal trees, wherein determining an abnormal forest of trees includes considering the normal thresholds of each sensor.

* * * * *

UNITED STATES PATENT AND TRADEMARK OFFICE
CERTIFICATE OF CORRECTION

PATENT NO. : 10,962,968 B2  
APPLICATION NO. : 15/951798  
DATED : March 30, 2021  
INVENTOR(S) : Abdulmonam Al-Maghlouth, Obiomalotaoso Leonard Isichei and Mohammad Fahad Al-Qasimi Page 1 of 1

It is certified that error appears in the above-identified patent and that said Letters Patent is hereby corrected as shown below:

On the Title Page

Item (56), References Cited, Column 2, Line 1, delete "Mukheljee" and insert -- Mukherjee --.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*